United States Patent
Amou et al.

(10) Patent No.: US 10,926,800 B2
(45) Date of Patent: Feb. 23, 2021

(54) SUSPENSION TOWER

(71) Applicant: TOYOTA JIDOSHA KABUSHIKI KAISHA, Toyota (JP)

(72) Inventors: Junichi Amou, Aichi-gun (JP); Mariko Tokunaga, Toyota (JP); Ryuusuke Nakayama, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 16/363,489

(22) Filed: Mar. 25, 2019

(65) Prior Publication Data
US 2019/0300057 A1 Oct. 3, 2019

(30) Foreign Application Priority Data

Mar. 29, 2018 (JP) ................................. 2018-063821

(51) Int. Cl.
| | | |
|---|---|---|
| *B62D 21/11* | (2006.01) | |
| *B62D 25/08* | (2006.01) | |
| *B60G 15/06* | (2006.01) | |
| *B60G 13/00* | (2006.01) | |

(52) U.S. Cl.
CPC ............ *B62D 21/11* (2013.01); *B60G 13/003* (2013.01); *B60G 15/067* (2013.01); *B62D 25/088* (2013.01)

(58) Field of Classification Search
CPC .... B62D 25/088; B62D 21/11; B60G 15/068; B60G 15/067; B60G 13/003
USPC ......................................................... 280/788
See application file for complete search history.

(56) References Cited

U.S. PATENT DOCUMENTS

| | | | | |
|---|---|---|---|---|
| 5,536,035 A | * | 7/1996 | Bautz ....................... | B60G 3/20 280/124.139 |
| 6,113,144 A | * | 9/2000 | Lapic ....................... | B60G 7/02 280/124.155 |
| 7,559,402 B2 | * | 7/2009 | Jennings ................ | B62D 21/02 180/232 |
| 8,141,904 B2 | * | 3/2012 | Akaki .................... | B62D 21/09 280/784 |
| 8,727,380 B2 | * | 5/2014 | Akaki .................... | B62D 21/02 280/788 |
| 8,807,597 B2 | * | 8/2014 | Akaki .................. | B62D 21/152 280/784 |
| 2012/0306234 A1 | | 12/2012 | Akaki et al. | |

FOREIGN PATENT DOCUMENTS

JP    5367151 B2    12/2013

* cited by examiner

*Primary Examiner* — Ruth Ilan
(74) *Attorney, Agent, or Firm* — Sughrue Mion, PLLC

(57) ABSTRACT

An outer housing of a suspension tower has a storage compartment which supports and stores an absorber at an upper part thereof, and an outer housing front leg and an outer housing rear leg which extend from ends, in a vehicle front-and-rear direction, of the storage compartment in a downward direction. An inner panel of the suspension tower has an inner panel front leg which extends from a front end, in the vehicle front-and-rear direction, of a reinforcement in the downward direction, and an inner panel rear leg which extends from a rear end, in the vehicle front-and-rear direction, of the reinforcement in the downward direction. A lower end of the inner panel front leg is positioned at an upper position in a vehicle up-and-down direction in relation to the outer housing front leg.

7 Claims, 5 Drawing Sheets

SUSPENSION TOWER

CROSS REFERENCE TO RELATED APPLICATION

This application claims priority to Japanese Patent Application No. 2018-063821 filed on Mar. 29, 2018, which is incorporated herein by reference in its entirety including the specification, claims, drawings, and abstract.

TECHNICAL FIELD

The present disclosure relates to a suspension tower of a vehicle which supports an absorber which suppresses vibration of wheels.

BACKGROUND

In a vehicle, there is provided a frame which is formed in a ladder shape by a pair of left and right main frames (side frames) which extend in a vehicle length direction (vehicle front-and-rear direction) and a plurality of cross members which connect between the main frames. At a front part of each main frame, there is provided a suspension tower which supports and stores an absorber or the like of a front wheel suspension apparatus.

The suspension tower is formed by welding an outer housing and an inner panel, and, on the outer housing, there is formed an absorber support unit which supports an apex of the absorber.

In addition, from respective ends of the outer housing in the vehicle front-and-rear direction, an outer housing front leg and an outer housing rear leg are formed in a downward direction, and, at inner sides of the outer housing front leg and the outer housing rear leg, an inner panel front leg and an inner panel rear leg are formed in the downward direction from respective ends of the inner panel in the vehicle front-and-rear direction.

Moreover, on the outer housing front leg, the outer housing rear leg, the inner panel front leg, and the inner panel rear leg, there are respectively formed flanges which facilitate fixation between the suspension tower and the main frame (for example, JP 05367151 B).

SUMMARY

Vehicle front wheels are provided at a front side in the vehicle front-and-rear direction in relation to the suspension towers, and the absorbers which extend from the respective suspension towers are inclined toward a side of the vehicle front wheels.

Thus, the suspension tower receives a large impact force on the vehicle front wheel side, and, in addition, a stress generated in the inner panel front leg is larger than a stress generated in the outer housing front leg.

However, in the related art, the outer housing front leg and the inner panel front leg have been formed in the same length.

Because of this structure, in order for the suspension tower to tolerate the impact force received from the absorber, in particular, a protrusion width and a protrusion area of the flange respectively formed in the outer housing front leg and the inner panel front leg must be set large, leading to a problem that a component mass is increased.

The present disclosure relates to a suspension tower in which the stresses generated in the outer housing front leg and the inner panel front leg of the suspension tower are uniformalized so that an increase in weight is avoided while securing the strength of the suspension tower.

According to one aspect of the present disclosure, there is provided a suspension tower that supports and stores an apex of an absorber which buffers vibration received from a wheel, wherein the suspension tower is formed by combining an outer housing and an inner panel, the outer housing comprises: a storage compartment which protrudes in an outer side direction of the vehicle at an upper part thereof, and which supports and stores the apex of the absorber; an outer housing front leg which extends from a front end, in a vehicle front-and-rear direction, of the storage compartment in a downward direction, and which is fixed to a frame of the vehicle; and an outer housing rear leg which extends from a rear end, in the vehicle front-and-rear direction, of the storage compartment in the downward direction, and which is fixed to the frame of the vehicle; the inner panel of the suspension tower comprises: a reinforcement which reinforces the outer housing; an inner panel front leg which extends from a front end, in the vehicle front-and-rear direction, of the reinforcement in the downward direction, which is combined to an inner side surface of the outer housing front leg, and which is fixed to the frame of the vehicle; and an inner panel rear leg which extends from a rear end, in the vehicle front-and-rear direction, of the reinforcement in the downward direction, which is combined to an inner side surface of the outer housing rear leg, and which is fixed to the frame of the vehicle, and a lower end of the inner panel front leg is positioned at an upper position in a vehicle up-and-down direction in relation to the outer housing front leg.

Because the suspension tower of the present disclosure has the above-described structure, the stresses generated in the legs of the outer housing and the legs of the inner panel forming the suspension tower can be uniformalized. In addition, because the front leg of the inner panel is shorter than the outer housing front leg, it becomes unnecessary to increase the amounts of protrusion and the protrusion areas of the flanges formed on the outer housing legs and the inner panel legs, and thus, there can be obtained an advantage in that an increase in weight of the suspension tower can be avoided.

BRIEF DESCRIPTION OF DRAWINGS

Embodiment(s) of the present disclosure will be described by reference to the following figures, wherein.

DESCRIPTION OF EMBODIMENTS (Explanation of Frame)

Figure 1:
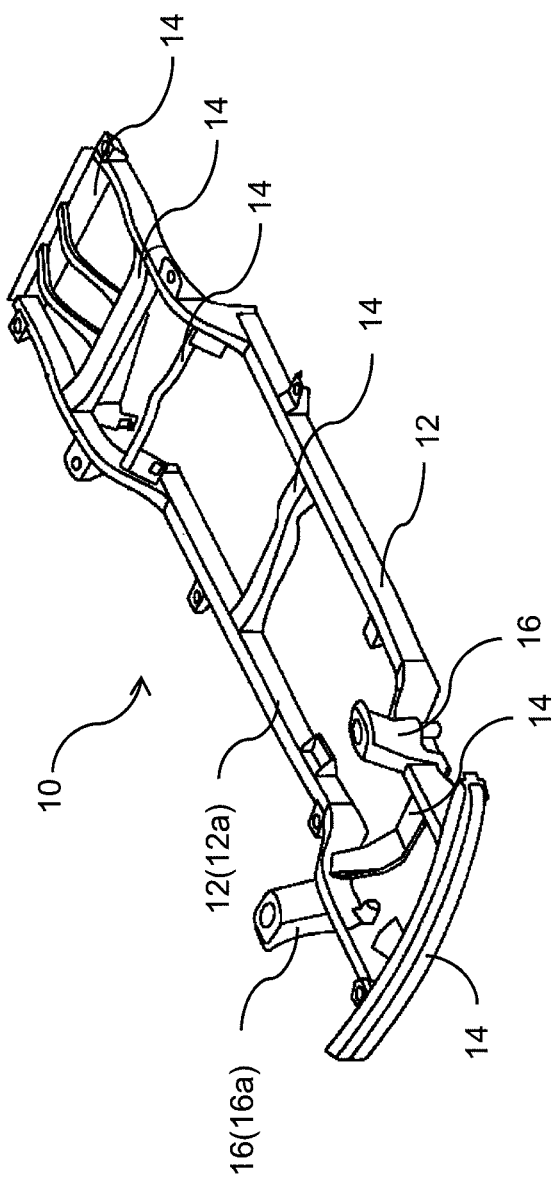
FIG. 1 is a perspective diagram explaining a frame of a vehicle.

A frame of a vehicle will now be described with reference to the drawings. FIG. 1 is a perspective diagram explaining a typical frame of a typical vehicle.

In FIG. 1, the vehicle comprises a frame 10 at a lower part thereof. The frame 10 includes a pair of left and right main frames (side frames) 12 which extend in a length direction (front-and-rear direction) of the vehicle. The main frame 12 at a right side of the vehicle in the front direction may also be referred to as a "first main frame 12a" as necessary.

Six cross members 14 are bridged in a ladder shape between the main frames 12 in the order from the front side in the vehicle front-and-rear direction, and are welded to the main frames 12. The number of the cross members is not limited to six, and may be suitably selected according to the type of the vehicle. In addition, the cross members 14 may also be referred to as a first cross member 14, a second cross member 14, . . . in the order from the front side of the vehicle.

In each of the main frames 12 on both sides, a suspension tower 16 which supports an apex of an absorber (not shown in FIG. 1) to be described later is attached at a position near the second cross member 14. The suspension tower 16 supports and stores the apex of the absorber (not shown; to be described later) which buffers vibration received from the wheel of the vehicle (not shown).

With regard to the suspension towers 16, a suspension tower fixed on the right side in a vehicle width direction may be particularly referred to as a "first suspension tower 16a" when necessary.

(Structure of Suspension Tower of Related Art)

A structure of a suspension tower of related art will now be described with reference to the drawings.

Figure 2:
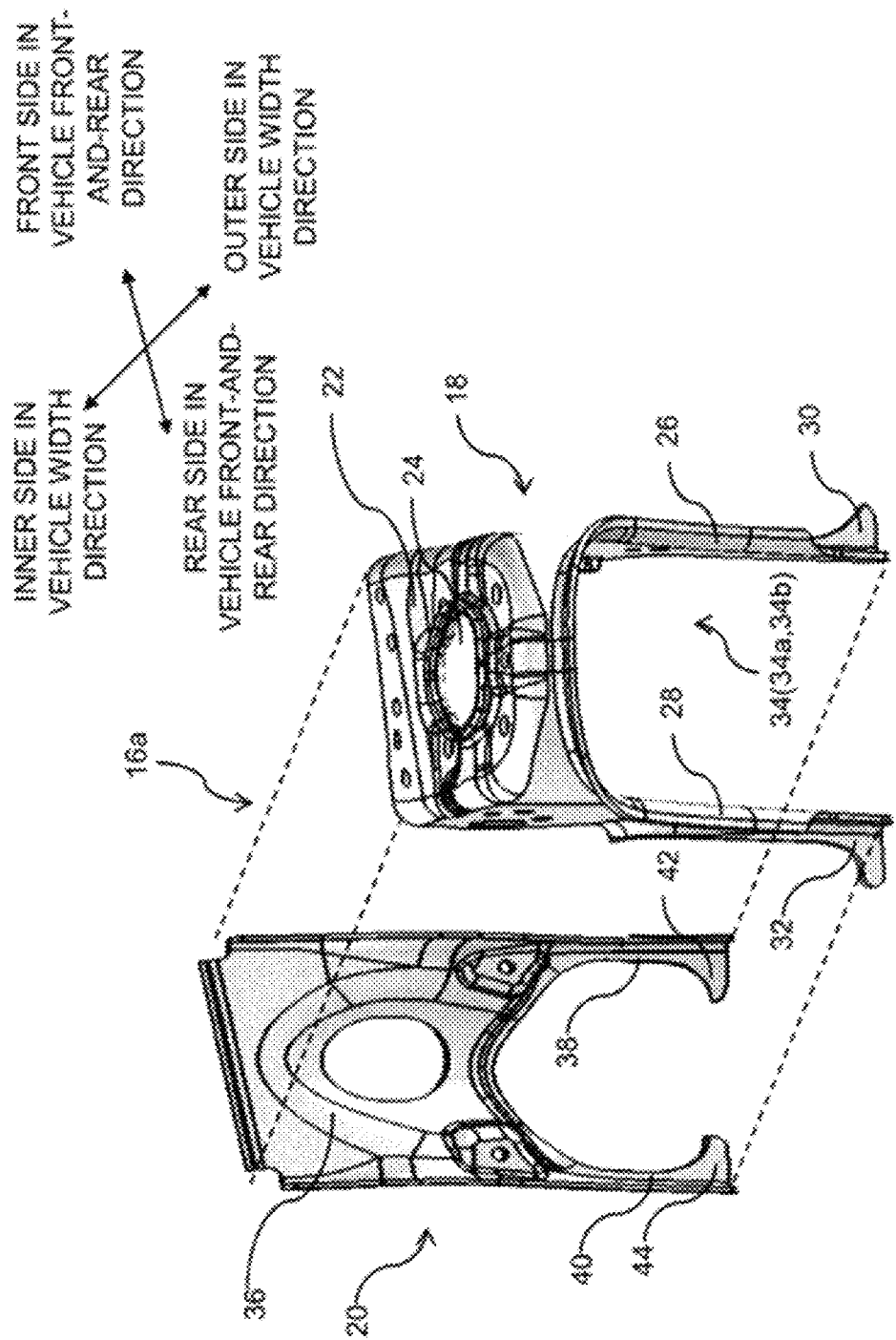
FIG. 2 is an outer appearance perspective diagram showing a structure of a suspension tower of related art.

FIG. 2 is an outer appearance perspective diagram showing the structure of the suspension tower of the related art, and in particular, enlarging the suspension tower 16 of FIG. 1.

In FIG. 2, the suspension tower 16 is generally formed by combining an outer housing 18 and an inner panel 20 by welding.

At an upper part of the outer housing 18 of the suspension tower 16, a storage compartment 22 which protrudes to an outer side in the vehicle width direction and which supports and stores the apex of the absorber is formed. In the storage compartment 22, a hole 24 is formed to which the apex of the absorber is fitted and fixed. The support and storage of the absorber in the storage 22 will be described later.

At a lower part of the outer housing 18 of the suspension tower 16, there are formed an outer housing front leg 26 which extends from a front end, in the vehicle front-and-rear direction, of the storage compartment 22 in a downward direction and which is fixed to the main frame 12 of the vehicle by welding or the like, and an outer housing rear leg 28 which extends from a rear end, in the vehicle front-and-rear direction, of the storage compartment 22 in the downward direction, and which is fixed to the main frame 12 of the vehicle by welding or the like.

At a lower and outer side of the outer housing front leg 26, a first flange 30 protrudes in the front side in the vehicle front-and-rear direction.

At a lower and outer side of the outer housing rear leg 28, a second flange 32 protrudes in the rear side in the vehicle front-and-rear direction.

The first flange 30 and the second flange 32 help welding and fixation of the outer housing front leg 26 and the outer housing rear leg 28 with the main frame 12 of the vehicle.

An opening 34 is formed by the storage compartment 22 of the outer housing 18, the outer housing front leg 26, and the outer housing rear leg 28. An opening 34 at an inner side in the vehicle width direction is also particularly referred to as a "back-side opening 34a," and an opening 34 at an outer side in the vehicle width direction is also particularly referred to as a "face-side opening 34b," as necessary.

Next, in the inner panel 20 of the suspension tower 16, there are formed a reinforcement 36 which reinforces the outer housing 18, an inner panel front leg 38 which extends from a front end, in the vehicle front-and-rear direction, of the reinforcement 36 in the downward direction, and an inner panel rear leg 40 which extends from a rear end, in the vehicle front-and-rear direction, of the reinforcement 36.

The inner panel front leg 38 is combined with an inner side surface of the outer housing front leg 26 by welding or the like, and the inner panel rear leg 40 is combined with an inner side surface of the outer housing rear leg 28 by welding or the like. The inner panel front leg 38 and the inner panel rear leg 40 are further respectively fixed to the main frame 12 of the vehicle by welding or the like, so that the first suspension tower 16a is combined and fixed to the main frame 12 of the vehicle.

At a lower and inner side of the inner panel front leg 38, a third flange 42 protrudes in the rear side in the vehicle front-and-rear direction.

At a lower and outer side of the inner panel rear leg 40, a fourth flange 44 protrudes in the front side in the vehicle front-and-rear direction.

The third flange 42 and the fourth flange 44 facilitate the welding and fixation of the inner panel front leg 38 and the inner panel rear leg 40 with the main frame 12 of the vehicle.

The inner panel 20 is formed in a shape to fit the back-side opening 34a formed by the storage compartment 22 of the outer housing 18, the outer housing front leg 26, and the outer housing rear leg 28. As shown by a dotted line in FIG. 2, the reinforcement 36 of the inner panel 20 and the storage 22 of the outer housing 18 are fitted at the back-side opening 34a and are combined and fixed by welding or the like. In addition, the inner side surface of the outer housing front leg 26 of the outer housing 18 and an outer side surface of the inner panel front leg 38 of the inner panel 20 are fitted at the back-side opening 34a, and are combined and fixed by welding or the like. Further, the inner side surface of the outer housing rear leg 28 of the outer housing 18 and an outer side surface of the inner panel rear leg 40 of the inner panel 20 are fitted at the back-side opening 34a, and are combined and fixed by welding or the like.

Figure 3:
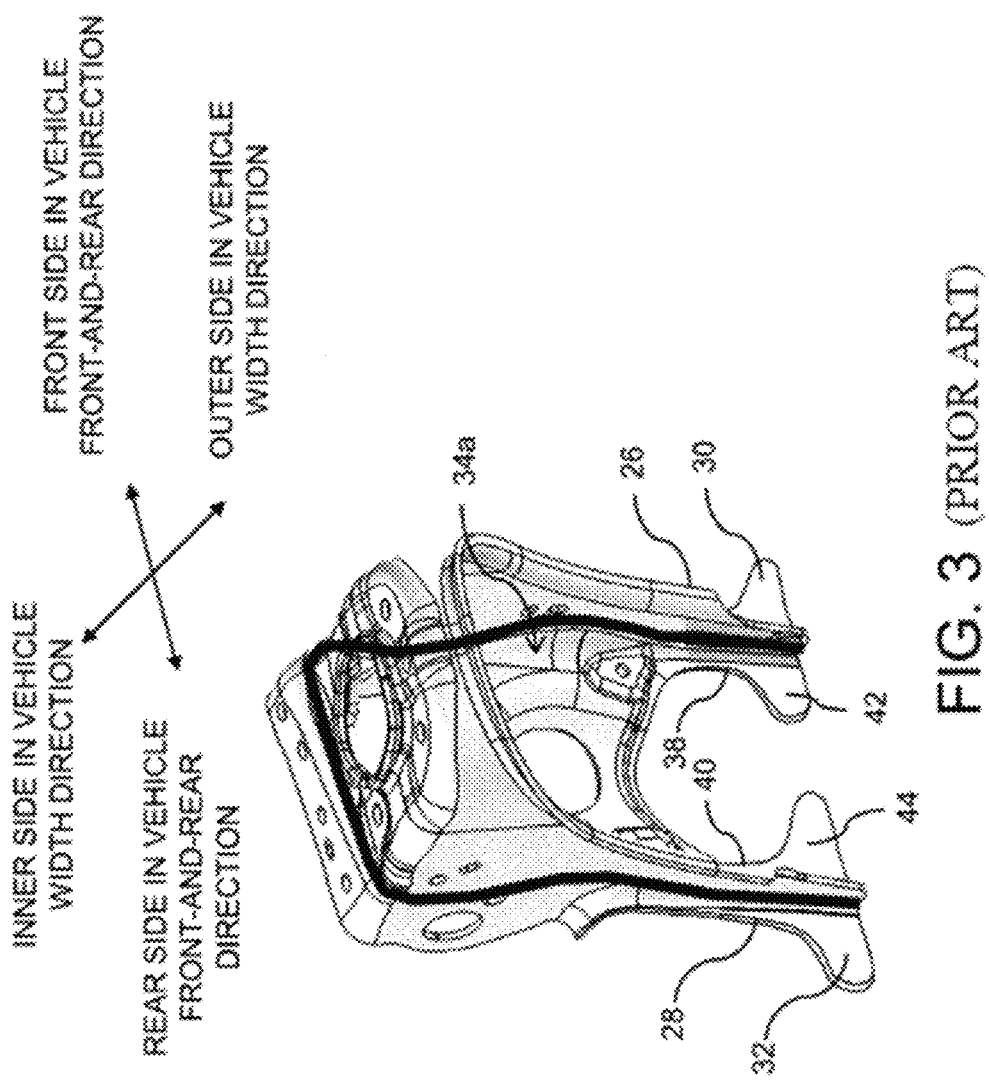
FIG. 3 is an outer appearance perspective diagram showing a structure of a suspension tower of related art.

FIG. 3 is an outer appearance perspective diagram showing a structure of the suspension tower of the related art, and shows a state after the outer housing 18 and the inner panel 20 are fitted at the back-side opening 34a and are combined and fixed by welding or the like, as explained above with reference to FIG. 2.

A thick solid line of FIG. 3 shows a portion where the outer housing 18 and the inner panel 20 are fitted at the back-side opening 34a, and are combined and fixed by welding or the like.

(Structure of Absorber)

Figure 4:
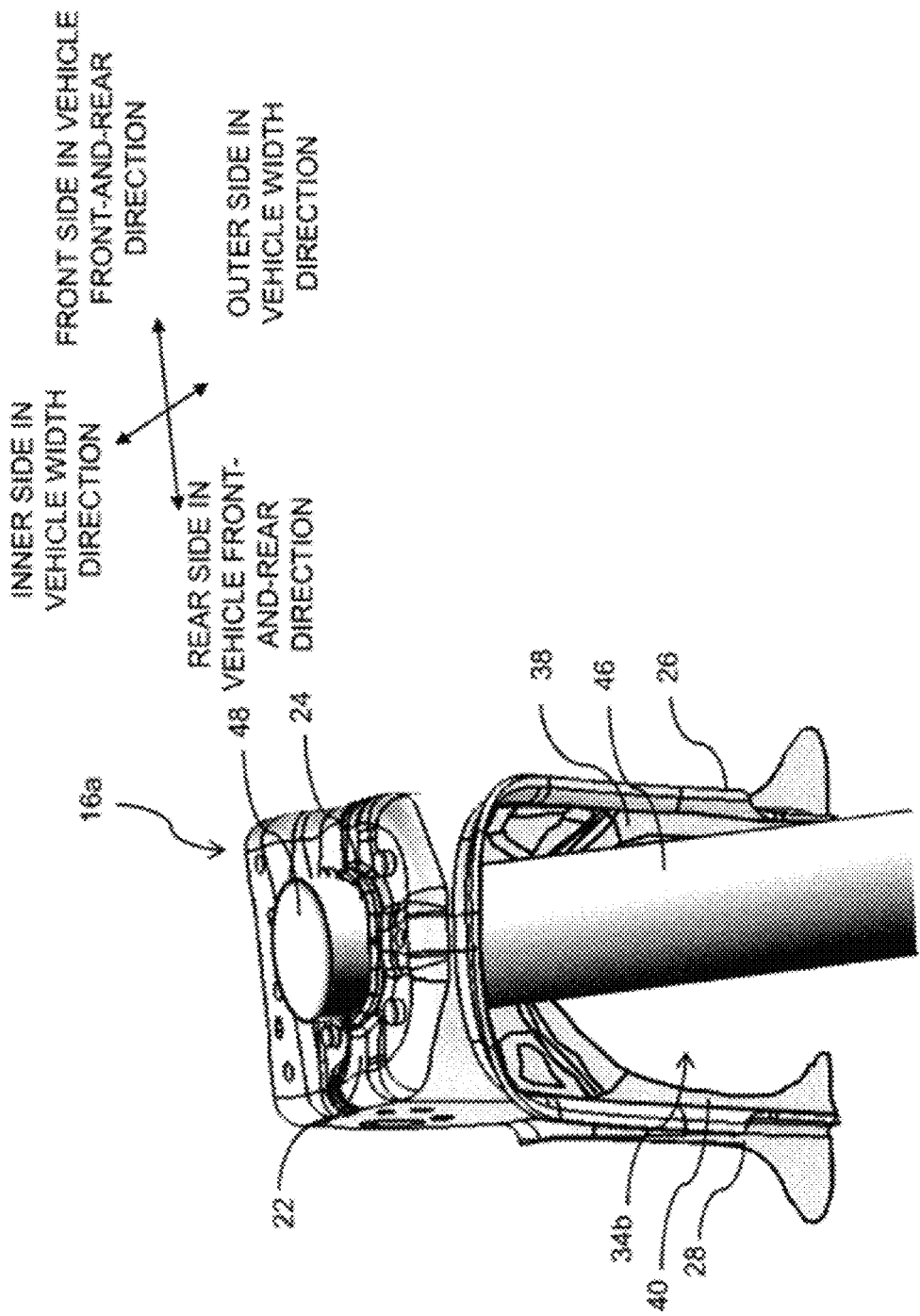
FIG. 4 is an outer appearance perspective diagram showing a structure of a suspension tower of related art.

FIG. 4 is an outer appearance perspective diagram showing a structure of the suspension tower of the related art, and shows a state in which an apex 48 of an absorber 46 is stored and supported in the storage compartment 22 of the first suspension tower 16a.

The absorber 46 is also called a strut, and alternatively, a spring may be wound around the absorber 46.

The apex 48 of the absorber 46 is fitted to and fixed in the hole 24 formed in the storage compartment 22 of the first suspension tower 16a. The absorber 46 extends from the face-side opening 34b of the first suspension tower 16a in a front wheel direction of the vehicle. A lower end of the absorber 46 is combined to an axle of the wheel (not shown), and the absorber 46 buffers vibration of a vehicle body due to an impact force received by the wheel.

Because the absorber 46 receives the impact force from the axle, the impact force is transferred from the storage compartment 22 of the first suspension tower 16a to the outer housing front leg 26, the outer housing rear leg 28, the inner panel front leg 38, and the inner panel rear leg 40, and a stress (resistive force) is generated respectively in the outer housing front leg 26, the outer housing rear leg 28, the inner panel front leg 38, and the inner panel rear leg 40.

In this process, as shown in FIG. 4, because the absorber 46 provided on the first suspension tower 16a is inclined toward the front side in the vehicle front-and-rear direction; that is, the front wheel side, in FIG. 3, a large stress is generated in the outer housing front leg 26 and the inner panel front leg 38 at the front side in the vehicle front-and-rear direction.

However, as shown in FIG. 3, because lengths of the outer housing front leg 26 and the inner panel front leg 38 are the same in the first suspension tower 16a, a larger stress is generated in particular in the inner panel front leg 38 than in the outer housing front leg 26.

Because of this, in order for the combining force of the first suspension tower 16a and the main frame 12 (FIG. 1) to tolerate the stress generated in the outer housing legs and the inner panel legs, in particular, in the outer housing front leg 26 and the inner panel front leg 38, as shown in FIG. 3, amounts of protrusion and protrusion areas are increased for the first flange 30 of the outer housing front leg 26, the second flange 32 of the outer housing rear leg 28, the third flange 42 of the inner panel front leg 38, and the fourth flange 44 of the inner panel rear leg 40, to strengthen the combining force with the frame 10. Thus, the mass of the first suspension tower 16a is consequently increased.

Embodiments

Next, details of a suspension tower according to embodiments of the present disclosure will be described with reference to the drawings.

Figure 5:
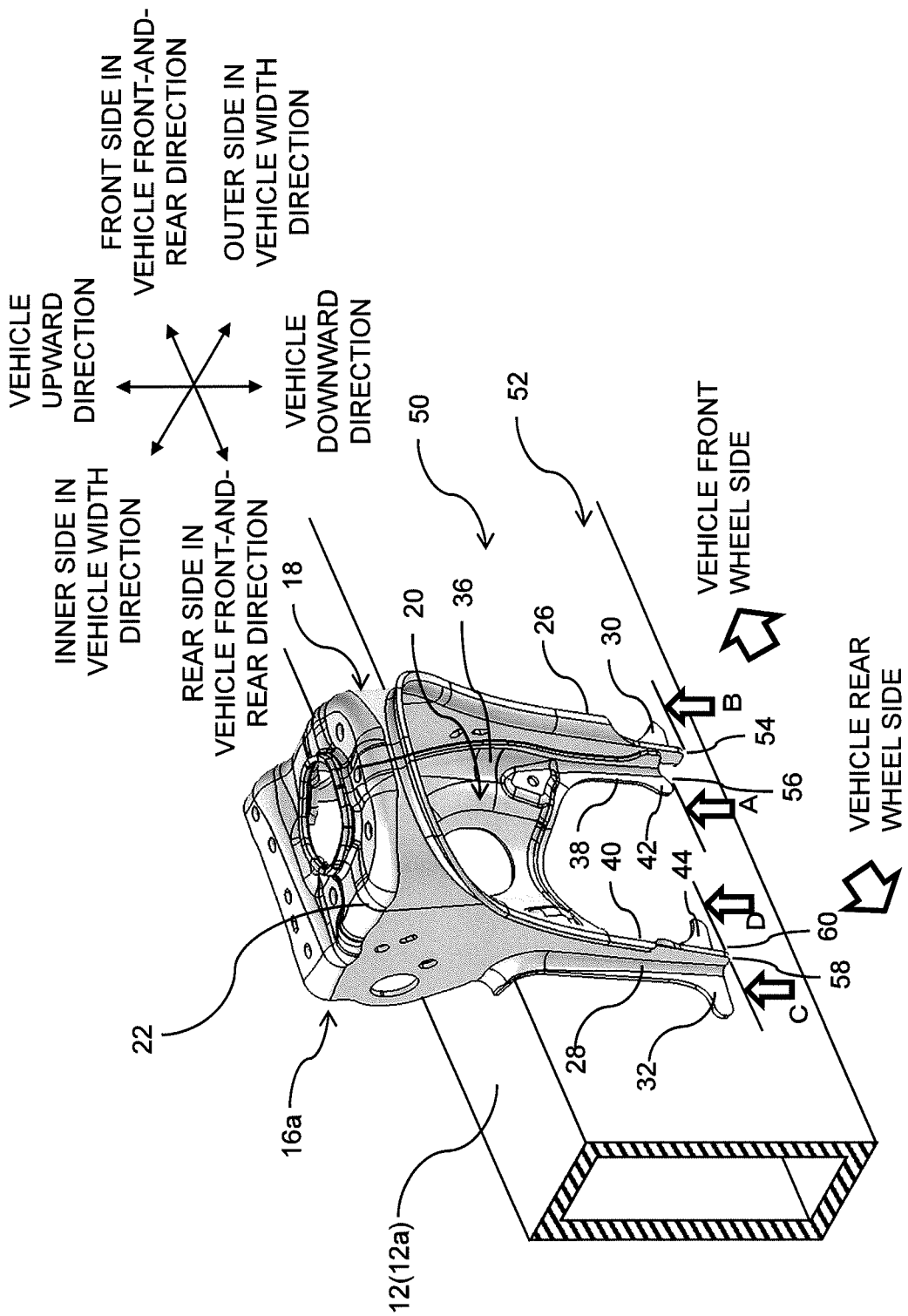
FIG. 5 is an outer appearance perspective diagram showing details of a suspension tower according to embodiments of the present disclosure.

FIG. 5 is an outer appearance perspective diagram showing details of the suspension tower according to embodiments of the present disclosure.

First Embodiment

The first suspension tower 16a according to a first embodiment of the present disclosure is characterized in a length or a position of legs of the outer housing 18 and the inner panel 20, and the other structures of the first suspension tower 16a are similar to those of the structure described above with reference to FIGS. 1-4.

Similar to the structure described above with reference to FIG. 4, the absorber 46 provided in the first suspension tower 16a according to the first embodiment of the present disclosure is inclined toward the front side in the vehicle front-and-rear direction; that is, the front wheel side shown by a hollow white arrow.

Because of this, in FIG. 5, a large stress is generated in the outer housing front leg 26 and the inner panel front leg 38 at the front side in the vehicle front-and-rear direction, and a larger stress is particularly generated in the inner panel front leg 38 than in the outer housing front leg 26.

In the first embodiment, as shown in FIG. 5, a position of a first lower end 54 of the outer housing front leg 26 is at a position of a hollow white arrow B, and a position of a third lower end 56 of the inner panel front leg 38 of the first suspension tower 16a is at a position of a hollow white arrow A which is at an upper position in the vehicle upward direction relative to the position of the hollow white arrow B. In other words, the position of the third lower end 56 of the inner panel front leg 38 is set at an upper position in the vehicle upward direction with respect to the position of the first lower end 54 of the outer housing front leg 26.

The structure may alternatively be described as a structure in which a length of a normal extending from the third lower end 56 of the inner panel front leg 38 of the first suspension tower 16a to the storage compartment 22 of the first suspension tower 16a is shorter than a length of a normal extending from the first lower end 54 of the outer housing front leg 26 to the storage compartment 22 of the first suspension tower 16a.

Further, as shown in FIG. 5, in the first suspension tower 16a, the position of the first lower end 54 of the outer housing 26 provided on the front wheel side of the vehicle (front wheel side shown by a hollow white arrow) is at the position of the hollow white arrow B, and the position of the third lower end 56 of the inner panel front leg 38 is at the position of the hollow white arrow A which is at an upper position in the vehicle upward direction relative to the position of the hollow white arrow B. In other words, the structure may be described as a structure in which the position of the third lower end 56 of the inner panel front leg 38 provided on the front wheel side of the vehicle is set at an upper position in the vehicle upward direction in relation to the position of the first lower end 54 of the outer housing front leg 26.

By employing such a configuration, the stress applied to the inner panel front leg 38 of the first suspension tower 16a and the stress applied to the outer housing front leg 26 may be set uniform.

Second Embodiment

In a first suspension tower 16a according to a second embodiment of the present disclosure, the first main frame 12a at the right side in the front-and-rear direction of the vehicle is formed in a hollow, approximate block shape, with a thin plate of aluminum alloy or iron as a material. The first main frame 12a has a relatively high rigidity at a corner portion 52 and a relatively low rigidity at a middle portion 50.

Because of this, the first lower end 54 of the outer housing front leg 26 of the first suspension tower 16a may be provided near the corner 52 of the first main frame 12a having relatively high rigidity, and the third lower end 56 of the inner panel front leg 38 of the first suspension tower 16a may be provided at the middle portion 50 of the first main frame 12a having relatively weak rigidity.

With such a configuration, because the middle portion 50 of the first main frame 12a has a relatively weak rigidity and may be deflected, the received stress can be distributed. Thus, the strong stress applied to the inner panel front leg 38 having a shorter length is distributed to the middle portion 50 of the first main frame 12a, and the stress may be tolerated.

Third Embodiment

A third embodiment of the present disclosure is applied to the first and second embodiments. As shown in FIG. 5, in the first suspension tower 16a, a position of a second lower end 58 of the outer housing rear leg 28 provided at the rear wheel side of the vehicle (rear wheel side shown by a hollow white arrow) is at a position of a hollow white arrow C, and a position of a fourth lower end 60 of the inner panel rear leg 40 is at a position of a hollow white arrow D. These positions are at the same height in the vehicle up-and-down direction. In other words, the position, in the vehicle up-and-down direction, of the second lower end 58 of the outer housing rear leg 28 provided at the rear wheel side of the vehicle and the position, in the vehicle up-and-down direction, of the fourth lower end 60 of the inner panel rear leg 40 are the same.

By employing such a configuration, the stresses applied to the outer housing front leg 26, the inner panel front leg 38, the outer housing rear leg 28, and the inner panel rear leg 40 of the first suspension tower 16a can be set uniform.

Because of this, it becomes unnecessary to increase the amount of protrusion and the protrusion area for the first flange 30 through the fourth flange 44, and the increase in weight of the first suspension tower 16a can be avoided.

The invention claimed is:

1. A suspension tower that supports and stores an apex of an absorber which buffers vibration received from a wheel, wherein the suspension tower is formed by combining an outer housing and an inner panel, the outer housing comprises:
  a storage compartment which protrudes in an outer side direction of the vehicle at an upper part thereof, and which supports and stores the apex of the absorber;
  an outer housing front leg which extends from a front end, in a vehicle front-and-rear direction, of the storage compartment in a downward direction, and which is fixed to a frame of the vehicle; and
  an outer housing rear leg which extends from a rear end, in the vehicle front-and-rear direction, of the storage compartment in the downward direction, and which is fixed to the frame of the vehicle,
the inner panel of the suspension tower comprises:
  a reinforcement which reinforces the outer housing;
  an inner panel front leg which extends from a front end, in the vehicle front-and-rear direction, of the reinforcement in the downward direction, which is combined to an inner side surface of the outer housing front leg, and which is fixed to the frame of the vehicle; and
  an inner panel rear leg which extends from a rear end, in the vehicle front-and-rear direction, of the reinforcement in the downward direction, which is combined to an inner side surface of the outer housing rear leg, and which is fixed to the frame of the vehicle, a lower end, that is combined to the frame of the vehicle, of the inner panel front leg is positioned above, in a vehicle up-and-down direction,
  a lower end, that is combined to the frame of the vehicle, of the outer housing front leg,
  the lower end of the outer housing front leg comprises a flange that is combined to the frame of the vehicle, and the lower end of the inner panel front leg comprises a flange that is combined to the frame of the vehicle, and the flange of the lower end of the outer housing front leg protrudes further toward a front end of the vehicle than all other portions of the outer housing front leg, whereas the flange of the lower end of the inner panel front leg protrudes further toward a rear end of the vehicle than all other portions of the inner panel front leg, wherein
  the flange of the lower end of the outer housing front leg and the flange of the lower end of the inner panel front leg each comprise an upper edge that faces upward in the vehicle up-and-down direction, and the lower edge that faces downward in the vehicle up-and-down-direction, and
  the lower edge of the flange of the inner panel front leg is position above, in the vehicle up-and-down direction, the lower edge of the flange of the outer housing front leg.

2. The suspension tower according to claim 1, wherein a lower end of the outer housing rear leg and a lower end of the inner panel rear leg are positioned at the same position in the vehicle up-and-down direction.

3. The suspension tower according to claim 2, wherein the outer housing front leg and the inner panel front leg are positioned nearer to the front end of the vehicle than are the outer housing rear leg and the inner panel rear leg.

4. The suspension tower according to claim 1, wherein the outer housing front leg and the inner panel front leg are positioned nearer to the front end of the vehicle than are the outer housing rear leg and the inner panel rear leg.

5. The suspension tower according to claim 1, wherein the lower end of the inner panel front leg is combined to a middle portion of the frame of the vehicle, while the lower end of the outer housing front leg is combined to a lower end of the frame of the vehicle.

6. A suspension tower that supports and stores an apex of an absorber which buffers vibration received from a wheel, wherein the suspension tower is formed by combining an outer housing and an inner panel,
the outer housing comprises:
  a storage compartment which protrudes in an outer side direction of the vehicle at an upper part thereof, and which supports and stores the apex of the absorber;
  an outer housing front leg which extends from a front end, in a vehicle front-and-rear direction, of the storage compartment in a downward direction, and which is fixed to a frame of the vehicle; and
  an outer housing rear leg which extends from a rear end, in the vehicle front-and-rear direction, of the storage compartment in the downward direction, and which is fixed to the frame of the vehicle,
the inner panel of the suspension tower comprises:
  a reinforcement which reinforces the outer housing;
  an inner panel front leg which extends from a front end, in the vehicle front-and-rear direction, of the reinforcement in the downward direction, which is combined to an inner side surface of the outer housing front leg, and which is fixed to the frame of the vehicle; and
  an inner panel rear leg which extends from a rear end, in the vehicle front-and-rear direction, of the reinforcement in the downward direction, which is combined to an inner side surface of the outer housing rear leg, and which is fixed to the frame of the vehicle,
a lower end of the inner panel front leg is positioned at an upper position in a vehicle up-and-down direction in relation to a lower end of the outer housing front leg, and
a lower end of the outer housing rear leg and a lower end of the inner panel rear leg are positioned at the same position in the vehicle up-and-down direction.

7. The suspension tower according to claim 6, wherein the outer housing front leg and the inner panel front leg are positioned nearer to a front end of the vehicle than are the outer housing rear leg and the inner panel rear leg.

\* \* \* \* \*